US006757450B1

(12) United States Patent
Gershony et al.

(10) Patent No.: US 6,757,450 B1
(45) Date of Patent: Jun. 29, 2004

(54) NEGOTIATED IMAGE DATA PUSH PROCESSING

(75) Inventors: Ori Gershony, Bellevue, WA (US); David L. Xu, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/539,113

(22) Filed: Mar. 30, 2000

(51) Int. Cl.[7] .............................................. G06K 9/60
(52) U.S. Cl. ........................................ 382/303; 700/2
(58) Field of Search ................................. 382/303, 302, 382/304, 305, 306, 276, 277, 278, 307; 345/619, 689, 723, 506, 501, 530, 536, 537, 502, 204; 700/2; 709/227; 395/800; 358/1.6

(56) References Cited

U.S. PATENT DOCUMENTS

| | | | | |
|---|---|---|---|---|
| 5,289,577 A | * | 2/1994 | Gonzales et al. | ............ 345/506 |
| 5,301,350 A | * | 4/1994 | Rogan et al. | ................ 395/800 |
| 5,999,977 A | * | 12/1999 | Riddle | ......................... 709/227 |
| 6,069,707 A | * | 5/2000 | Pekelman | .................... 358/1.6 |
| 6,392,665 B1 | * | 5/2002 | Argabright et al. | .......... 345/723 |
| 6,459,425 B1 | * | 10/2002 | Holub et al. | ................. 345/204 |

OTHER PUBLICATIONS

"Pull Technology," *Computer Desktop Encyclopedia*, The Computer Language Company, Inc., vol. 12.1, 1999.
"Push Technology," *Computer Desktop Encyclopedia*, The Computer Language Company, Inc., vol. 12.1, 1999.
G. Cybenko et al, "The Foundations of Information Push and Pull," [web page], Sep. 1997. http://www.dartmouth.edu/~gvc/push.html. [Accessed Nov. 12, 1999].

"Imaging," Sun Microsystems, Inc., [web page], 1997–1999. http://www.hio.hen.nl/usr/local/java/docs/guide/2d/spec/j2d-image.fm.html. [Accessed Nov. 12, 1999].
"Data–Pull Model Versus Data–Push Model," *Microsoft Developer's Network CD: Jul. 1999*, Microsoft Corporation, May 18, 1999.
"Interface ImageConsumer," *Java Platform 1.2*, Sun Microsystems, Inc., 1993–1998.
"Interface ImageProducer," *Java Platform 1.2*, Sun Microsystems, Inc., 1993–1998.
David Chappell, "Understanding Active X and OLE: A Guide for Developers and Managers," Microsoft Press: Redmond, Washington, 1996.
E. Stollnitz et al., "Wavelets for Computer Graphics: Theory and Applications," Morgan Kaufmann Publishers, Inc.: San Francisco, California, 1996.
W. Pennebaker et al., "JPEG: Still Image Data Compression Standard," Chapman & Hall: New York, New York, 1993.

* cited by examiner

*Primary Examiner*—Jayanti K Patel
(74) *Attorney, Agent, or Firm*—Leydig, Voit & Mayer Ltd.

(57) ABSTRACT

An improved image data processing architecture utilizes a negotiation protocol with an information push technique to provide a more efficient and effective image data rendering pipeline. The improved image data processing architecture allows the optimization of data transfer through the use of image transfer parameters and flags. In another aspect of the invention, a selection mechanism is provided to allow a client application to easily select an image frame as the current frame in a multi-dimensional image. Image sinks within the invention may further support non-blocking behavior.

14 Claims, 3 Drawing Sheets

Frame 1: page 1

Frame 2.1: page 2, low resolution    Frame 2.2: page 2, high resolution

Frame 3: page 3

NEGOTIATED IMAGE DATA PUSH PROCESSING

TECHNICAL FIELD

This invention relates generally to image processing and, more particularly, relates to processing image data using a negotiation structure within a push architecture.

BACKGROUND OF THE INVENTION

Image processing is critical to many computer-related endeavors, such as the display of graphics received over a network, or rendering of an image from a file of image data. Quite often image data is stored or received in a form that requires transformation prior to rendering. For example, image data may have to be scaled, decompressed and so on before it is in the format appropriate for the rendering entity. The process by which image data is received, transformed, and rendered is referred to as the "image pipeline" or "image rendering pipeline."

In an object-oriented environment, the pipeline is made up of a series of source and sink objects that accomplish the desired transformations. For example, compressed image data may be received from a network connection by a decoder object, which acts as an image data source for the subsequent object in the image-rendering pipeline. The subsequent object, or "sink", could perform for example an encoding or scale transformation function, and might in turn act as an image data source for another object further along in the pipeline.

Traditionally, the image rendering pipeline components have been constructed to utilize a "pull" architecture. In general pull technologies essentially entail a data consumer specifically requesting information from a particular data provider. Downloading a Web page with a Web browser is a high level example of the use of pull technology. In the context of the image rendering pipeline, the use of pull technology generally means that a transaction between a data source and a data sink is driven by the data sink rather than the data source. Thus in the pipeline example above, the sink would specifically request the image data from the source, which is a decoder in this example. If the source does not currently have the data being requested, due for example to a delay on the network connection, then a potentially protracted waiting condition could occur. Another drawback to the use of pull technology is excess memory usage; at any given point in time, the sink is not necessarily aware of the image data currently possessed by the source, and consequently cannot know exactly when to ask for a particular item of data. Consequently, the source will generally store its received data at least until it receives a request for the data from the sink.

Pull technology may be contrasted with "push" technology. The term "push" technology refers to a data distribution technology in which selected data is delivered from a data source to a data sink at a time and in a manner determined by the source rather than the sink. Again using the Internet as a high level example, PointCast is a service which uses push technology. PointCast was an early provider of a service capable of delivering a selection of news and stock quotes to a user's computer at certain intervals without a contemporaneous request for the data.

While there exist image rendering pipeline technologies that utilize push architecture, these technologies do not utilize the full potential of push technology because they lack a mechanism for optimizing the particular image data transfer parameters as a function of the needs and capabilities of both the source and sink.

SUMMARY OF THE INVENTION

In an embodiment of the invention, an image data source pushes image data to an image data sink. The bounds and details of the transfer are first decided via a negotiation which in general accommodates the preferences and limitations of both the source and the sink. The resultant data transfer is optimized, and avoids many drawbacks of both the pull architecture and the traditional, non-negotiated push architecture.

In a further embodiment of the invention, the image data is selected via a protocol for discovering and specifying a particular item of data from a multidimensional image data set. The protocol allows for the efficient querying of the data source to find the number of dimensions and the number of frames along any given dimension.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
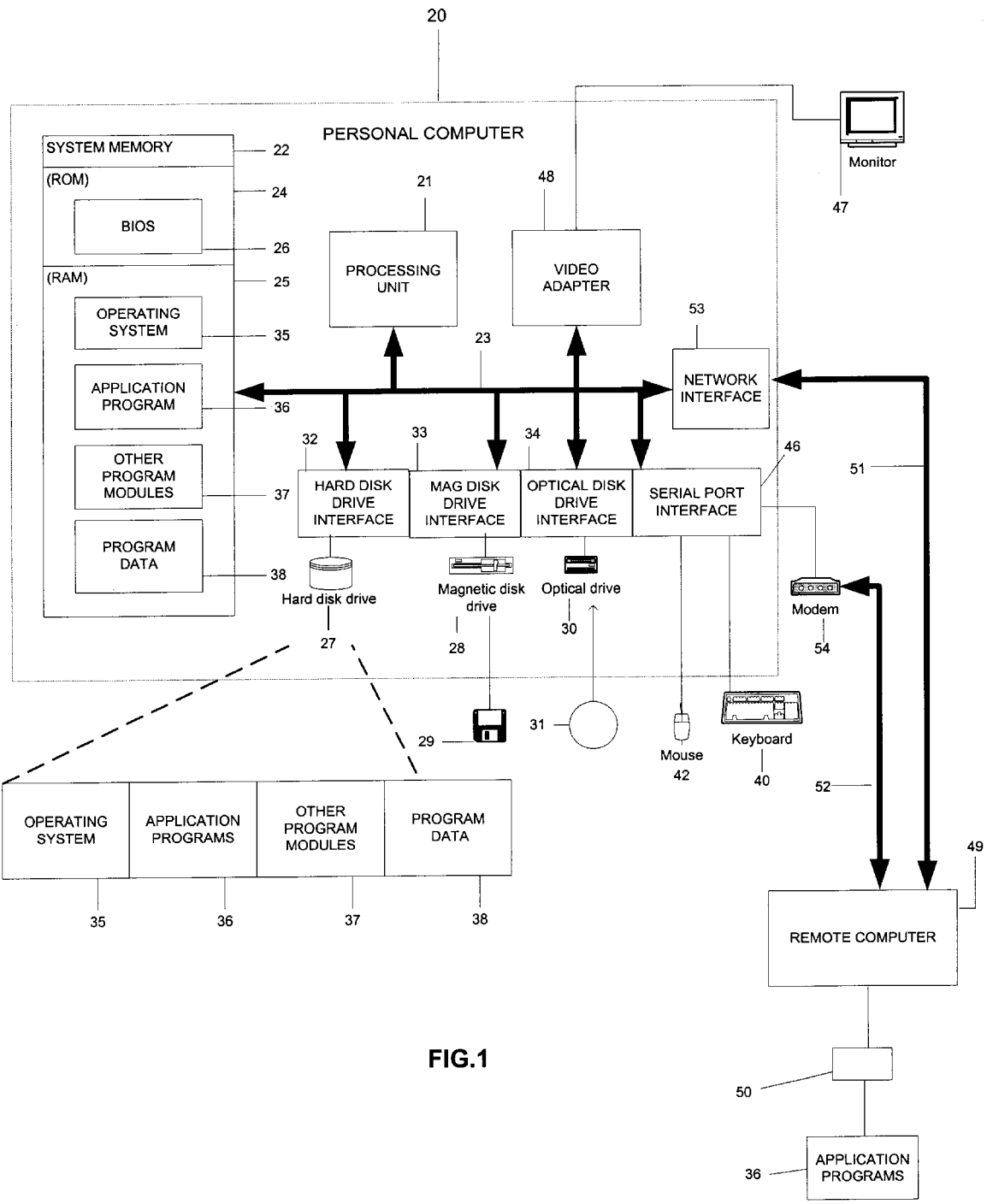
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the-monitor, personal computers typically include other peripheral output devices, not shown, such as speakers and printers.

The personal computer 20 may operate in a networked environment using logical connections to one or more remote computers, such as a-remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at -times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data.

In its simplest form, the image-rendering pipeline comprises a source object and a sink object created by the relevant application. These objects are interconnected so that information may be passed between them. The source may be, for example, a decoder, while the sink may be, for example, an encoder. In a preferred embodiment of the invention, the source pushes image data to the sink pursuant to a request by the application. Prior to the actual push of information, the source and sink negotiate the parameters of the transfer as will be described hereinafter.

Figure 2:
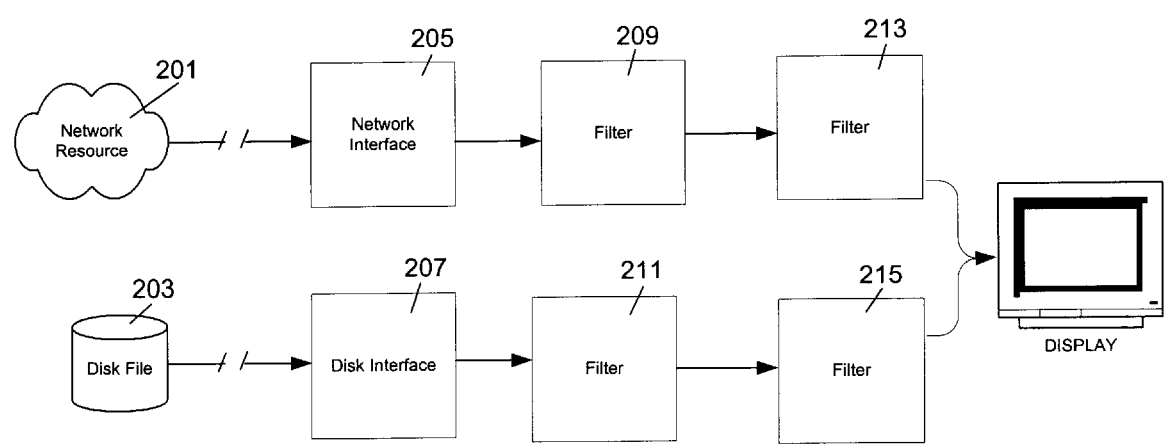
FIG. 2 is a simplified schematic of an image rendering pipeline.

The structure of an image-rendering pipeline is illustrated schematically in FIG. 2. The image data originating resources are illustrated as a network resource 201 or a disk file 203. Other resources may be used as well, such as any other input stream object or a memory buffer. In an object-oriented environment, the network interface 205 and disk interface 207, as well as filters 209, 211, 213, 215, are preferably objects, and accordingly support interfaces and associated methods. The filters, for example decoders and encoders, represent objects that convert, transform, or otherwise alter image data. A particular filter may be a sink with respect to a preceding filter and a source with respect to a subsequent filter. The image-rendering pipeline may be constructed by the client application either directly or via intermediate objects.

With respect to the image rendering pipeline, references herein to push technology conform with the ordinary meaning of the term, in that the image data source rather than the image data sink drives image-related transactions between the two, with the further understanding that the sink may participate via negotiation. The application may call a method such as PushIntoSink to cause the image source, such as the decoder object, to push its data to an image sink. In order to optimize the data transfer, the source and sink then negotiate to determine the exact manner and format in which the data will be conveyed. To this end, when the image source is prepared to start pushing image data to the sink, it calls an interface such as BeginSink to allow negotiation of the parameters of the data transfer between the source and sink. The call to the BeginSink method preferably also passes a pointer to an ImageInfo negotiation field containing transfer control information such as transfer control parameters and flags. The ImageInfo structure is an information structure such as the following:

GUID RawDataFormat;
PixelFormatID PixelFormat;
UINT Width, Height;
UINT TileWidth, TileHeight;
double Xdpi, Ydpi;
UINT Flags.

Within this structure, RawDataFormat indicates the file format ID for the native image data. This may be, for example, IMGFMT_JPEG, IMGFMT_PNG, and so on. For an in-memory bitmap image source, RawDataFormat would be IMGFMT_MEMORYBMP. PixelFormat corresponds to the natural pixel format for the source, and is set to PIXFMT_DONTCARE if the source has no preference for pixel format. Width and Height give the source image dimensions, while Xdpi and Ydpi give the source image resolution. The preferred tile size for the source is preferably conveyed in the ImageInfo structure via TileWidth and TileHeight.

As indicated, the ImageInfo structure also preferably contains miscellaneous flags usable to convey other information about the source and the source image. For instance, a SINKFLAG_SCALABLE flag indicates whether the source image is fully scalable, while a SINKFLAG_PARTIALLY_SCALABLE flag indicates whether the source image is partially scalable. A non-scalable source can deliver the image in only one resolution, whereas a fully scalable source can deliver the image at all resolutions, and in this case, the sink will choose a preferred resolution as discussed below. By way of example, a metafile which contains vector graphics may be fully scalable, while bitmap source data is non-scalable. A partially scalable source can deliver the image at any one of a set of resolutions, and again in this case, the sink chooses a preferred resolution. However, the source then computes the closest resolution in the set of resolutions and informs the sink that that resolution will be used, as will be more fully described below.

Such scaling capability presents many benefits. For example, with respect to formats such as JPEG, Flashpix, and Wavelets, it is much faster to decode directly into a lower resolution representation than to fully decode the image data and later downscale it. An exemplary use of this technique would be in the generation of thumbnail images for display, where the source chooses a decode resolution which is as close as possible to the final rendering resolution rather than requiring full-resolution decoding of the image first by the source.

If the source image contains transparency, a SINKFLAG_HASALPHA flag will be set. A SINKFLAG_TOPDOWN flag can be set to indicate the source's preference to supply data in a top-down order, while a SINKFLAG_BOTTOMUP flag can be set to indicate the source's preference to supply data in a bottom-up order. Other flags include a SINKFLAG_FULLWIDTH flag, which indicates whether the source prefers to supply data in bands, and a SINKFLAG_MULTIPASS flag, which indicates whether the source prefers to supply data in multiple passes. If the source wants to composite the data of interest over data already existing in the sink, a SINKFLAG_COMPOSITE flag may be set.

Upon successful return from the BeginSink method, the sink fills the ImageInfo structure, which the source may then access, completing the negotiation between source and sink in most cases. In particular, the sink should fill out RawDataFormat with the file format ID if the sink can take raw image data in that format. In this case, the source then calls the PushRawData method to pass raw image data to the sink. If the sink cannot take raw image data from the source, it fills out RawDataFormat with IMGFMT_MEMORYBMP, in which case the source calls PushPixelData or Get/ReleasePixelDataBuffer as described below.

The sink should fill PixelFormat with the pixel format preferred by the sink. This may be the natural pixel format for the source, but need not be. In response, the source either sends the image data in the requested format or alternatively supplies the pixel data in a canonical format that all sinks support.

The source image dimensions (Width, Height) and resolution (Xdpi, Ydpi) are normally left unchanged by the sink. However, if the source has set the SINKFLAG_SCALABLE flag, then the sink may modify Width and Height to request scaling to a new dimension. The sink preferably also changes the resolution values in keeping with any requested dimension change. If the source has set the SINKFLAG_PARTIALLY_SCALABLE flag, then the sink may modify the dimension values (Width, Height) to suggest an ideal width and height to the source. The source will in turn call BeginSink again, listing the closest dimensions possible and clearing the SINKFLAG_PARTIALLY_SCALABLE flag. The sink may avoid the second call to BeginSink by leaving the width and height values unchanged and clearing the flag.

The sink may use TileWidth and TileHeight to express its preferred tile size, however if the SINKFLAG_FULLWIDTH flag is set, then the TileWidth must be the same as the Width, and the TileHeight is the preferred band height. The source is not required to use the tile size requested by the sink.

The flags of the ImageInfo structure are treated as follows by the sink:

SINKFLAG_SCALABLE:
  Left unchanged;
SINKFLAG_PARTIALLY_SCALABLE:
  Treated as described above;
SINKFLAG_HASALPHA:
  If this flag was set by the source, the sink can clear it to indicate that the sink cannot support alpha. Nonetheless, the source may still supply alpha information, leaving the sink to dispose of it in some manner;
SINKFLAG_TOPDOWN:
  The sink can set this flag to indicate whether it wants the source to supply pixel data in a top-down order;
SINKFLAG_BOTTOMUP:
  Left unchanged;
SINKFLAG_FULLWIDTH:
  The sink can set this flag to indicate whether it wants the source to supply data in bands. All sources are preferably able to supply data transfer in top-down banding order, regardless of preference;
SINKFLAG_MULTIPASS:
  If this flag was set by the source, the sink can clear it to indicate that the sink cannot support multipass, in which case the source preferably processes multipass data independently and gives the sink image data in a single pass. If the sink additionally sets the SINKFLAG_TOPDOWN flag, then the source preferably supplies data in sequential entire passes, and one band after another, without gaps;
SINKFLAG_COMPOSITE:
  If this flag was set by the source and the sink cannot support compositing behavior, then the sink preferably returns failure from the BeginSink method; and

SINKFLAG_WANTPROPS:

The sink can set this flag to indicate to the source that it wants image metadata/properties, i.e. that it wants a PushProperties call from the source. The source calls the PushProperties method to pass image properties to the sink, once the sink has indicated during negotiation via this flag that it wants such information.

The actual transfer of image data occurs after the above-described negotiation. For example, if the sink agreed during negotiation to accept raw data, the source now pushes raw data to the sink via a PushRawData method. If the format agreed upon during negotiation is IMGFMT_MEMORYBMP, the source calls the following methods using the listed parameters to pass image data to the sink:
method PushPixelData:

IN const RECT* rect,

IN const BitmapData* bitmapData,

IN BOOL lastPass;

method GetPixelDataBuffer:

IN const RECT* rect,

In PixelFormatID pixelFormat,

IN BOOL lastPass,

OUT BitmapData* bitmapData; and method ReleasePixelDataBuffer:

IN const BitmapData* bitmapData.

If the source currently has the pixel data in memory in the correct pixel format, then the source may simply call PushPixelData to pass a pointer to the pixel data directly to the sink. Otherwise, the source calls the GetPixelDataBuffer method to ask the sink to allocate memory for the transfer. After filling the buffer, the ReleasePixelDataBuffer method allows the sink to release the buffer, i.e. telling the sink to take the pixel data. The lastpass parameter tells the sink that this is the last pass over the specified image area.

The object creation, function and management will now be described in greater detail in the context of the Microsoft Windows® environment, with respect to an embodiment of the invention. For more background material regarding the component object model, the reader is referred to *Understanding Active X and OLE*, by David Chappell, Microsoft Press (1996), which is hereby incorporated by reference in its entirety. Initially, a client application wishing to use image data obtains an interface to an image factory object by calling CoCreateInstance with CLSID_ImagingFactory. Methods on this interface for creating image objects may include various different methods depending upon the desired originating source, such as the following:

Method:

CreateImageFromStream

Parameters:

IN IStream* stream,

OUT IImage** image

Method:

CreateImageFromFile

Parameters:

IN const WCHAR* filename,

OUT IImage** image

Method:

CreateImageFromBuffer

Parameters:

IN const VOID* buf,

IN UINT size,

IN BufferDisposalFlag disposal flag,

OUT IImage** image

These methods let the client application create image objects for various external data sources such as input stream, disk file, or resource data. Once created, the image object maintains a reference to the external data source, but does not immediately decode the image.

To create and initialize an image decoder object, the image object may use a method such as CreateImageDecoder. An application may also create and manipulate a decoder object directly as discussed below. Parameters for the CreateImageDecoder method may include parameters such as: IN IStream* stream; IN DecoderInitFlag flags; and OUT IImageDecoder** decoder. The appropriate decoder for the particular data at issue is located using the header bytes in the input data stream. The Flag parameter contains flag bits usable to specify certain desired properties of the decoder. For example, a DECODERINIT_NOBLOCK flag bit can be set to indicate that the decoder should be initialized to have non-blocking behavior if the particular decoder can support such behavior. This means that if the input stream blocks on a read (i.e. from a remote server on the network), the decoder will notify the caller that the stream is blocking and ask the caller to continue processing at a later time. This allows the caller to do other work using the same image decoder thread rather than being forced to wait.

Additionally, a DECODERINIT_BUILTIN1ST flag bit could be set to indicate that the built-in decoders should be used in preference to plug-in decoders when available. Similarly, an image sink object should be created to complete the relevant section of the image-rendering pipeline. The particular type of image sink used depends upon the steps required by the application. For example, a data sink may scale, compress, convert, or otherwise process the image data prior to use by the application.

The client application may interact with the image-rendering pipeline via the image object. The image object is able to obtain image data from a lower-level source such as the image decoder object. The image object preferably supports an interface such as the IImage interface. Methods exposed by this interface may include methods such as: GetPhysicalDimension (returns the image dimensions in the Windows himeric unit, 0.01 mm); GetImageInfo (returns the basic image information discussed in greater detail in connection with the ImageInfo structure); SetImageFlags (allows the application to indicate whether the image is read-only, and to suggest whether the image should be cached); Draw (displays the image onto a specified area of a destination graphics context); and PushIntoSink (tells the image object to push its data into an image sink).

Alternatively, the client application may interact with the decoder object directly via an interface such as the IImageDecoder interface. This interface allows finer control over the decoder object. This interface exposes methods such as InitDecoder. This method initializes the image decoder with a specified input stream (IN IStream* stream) according to flag parameters that determine how the decoder is to be initialized as discussed above in relation to the CreateImageDecoder method. A BeginDecode method is preferably supported, and should be called when it is desired to trigger the decoder object to begin decoding the currently selected frame. An IImageSink IN parameter can be passed into this method to specify the image sink object to receive the data. A method such as Decode may be supported by the IImageDecoder interface, to cause the decoder to continue decoding once begun. Finally, an EndDecode method is preferably callable to allow the application to cease decoding of the current frame.

Figure 3:
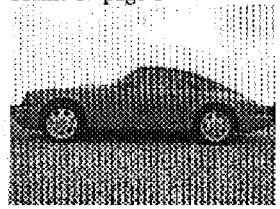
FIG. 3 is an illustration of a multi-dimensional set of image data.
Figure 3:
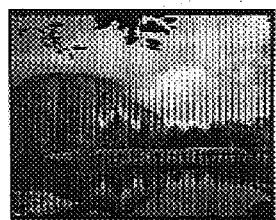
Figure 3:
Figure 3:
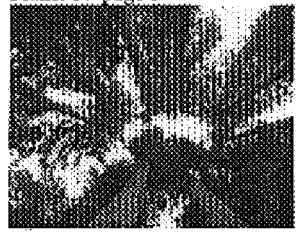

It is possible that the body of image data of concern describes a multi-dimensional image. For example, the image as a whole may extend both in a primary frame dimension and another dimension such as time or resolution. FIG. 3 illustrates a multi-dimensional image that has three levels of frames and two levels of resolution at the second frame level. It can be seen that Frame 1 corresponds to page 1, Frame 2.1 corresponds to a low resolution version of page 2, Frame 2.2 corresponds to a high resolution version of page 2, and Frame 3 corresponds to page 3. Thus, the body of image data corresponding to this entire image is two-dimensional. It can be seen that higher dimensionality is possible as well. For example, a time dimension could be added to any of the illustrated frames, as in an animated GIF file.

It is consequently desirable that an application be able to efficiently specify which frame of a non-rectangular array of image data is to be the currently selected frame regardless of dimensionality. To this end, the decoder object preferably exposes methods on an interface such as the IImageDecoder interface which allow the application to discover the image dimensionality and to set the currently active frame. In an embodiment of the invention, these methods are methods such as QueryFrameDimensions, GetFrameCount, and SelectActiveFrame, whose parameters are as follows:

QueryFrameDimensions

OUT UINT* count,

OUT GUID** dimensionsIDs;

GetFrameCount

IN const GUID* dimensionID,

OUT UINT* count;

SelectActiveFrame

IN const GUID* dimensionID,

IN UINT frameIndex.

The QueryFrameDimensions method returns the total number of frame dimensions. The most significant dimension preferably comes first followed by less significant dimensions. The GetFrameCount method returns the number of frames in the specified dimension. The SelectActiveFrame method is used to select a currently active image frame.

In the context of the example image of FIG. 3 an application might use the described methods as in the following pseudocode to set the current frame to 2.2:

1. call QueryFrameDimensions method returns 2 dimensions:FRAMEDIM_PAGE followed by FRAMEDIM_RESOLUTION 2. call GetFrameCount (FRAMEDIM_PAGE)

returns 3

3. call SelectActiveFrame(FRAMEDIM_PAGE, 1)

[because frame index is zero-based]

4. call GetFrameCount(FRAMEDIM_RESOLUTION)

returns 2

5. call SelectActiveFrame(FRAMEDIM_RESOLUTION, 1)

selects frame 2.2

It can be seen that the negotiation architecture described herein allows an image data source and image data sink to negotiate and optimize the details of a subsequent image data push from the source to the sink. This allows the use of a push architecture, with the advantages that conveys, such as the ability to avoid excess memory usage or long waits due to blocking conditions, while at the same time not incurring the deleterious effects, such as inefficiency of transfer, often associated with a traditional push architecture.

All of the references cited herein are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. Those of skill in the art will recognize that the elements of the illustrated embodiment can be modified in arrangement and detail without departing from the spirit of the invention. For example, although communications between an application and object, or between various objects, have been described, one of skill in the art will appreciate that such communications are often indirect, through intermediate objects or otherwise. Furthermore, while an embodiment of the invention has been described with reference to particular methods, flags, and interfaces, it is understood that other additional or alternative means may be used within the invention. Therefore, the invention as described herein contemplates all such embodiments as may come within the scope of the following claims and equivalents thereof.

We claim:

1. A method of transferring image data between an image data source and image data sink, comprising the steps of:

receiving a request at the image data source to push image data to the image data sink;

writing transfer control information to a negotiation field by the image data source, wherein the transfer control information includes transfer control parameters having dimension parameters and transfer control flags having a first flag and a second flag; and further wherein if the first flag is set by the source, the source image data is fully scalable, or if the second flag is set by the source, the source image data is partially scalable;

modifying the negotiation field by the sink to change an item of transfer control information, wherein if the first or second flag is set by the source, the sink modifies the dimension parameters to indicate preferred dimensions of the image data;

reading the modified negotiation field by the source; and pushing the image data from the source to the sink in accordance with the transfer control information of the modified negotiation field, wherein the image data is pushed in accordance with the preferred dimensions if the first flag is set by the source, or the image data is pushed in accordance with dimensions from a set of dimensions supported by the source that are closest to the preferred dimensions if the second flag is set by the source.

2. The method according to claim 1, wherein the second flag is set by the source, further comprising the step of further modifying the negotiation field by the image data source to change an item of transfer control information prior to the step of pushing the image data from the source to the sink in accordance with the transfer control information of the modified negotiation field.

3. The method according to claim 1, wherein the transfer control parameters comprise a raw data format parameter, and wherein the step of writing transfer control information to a negotiation field by the image data source comprises writing the raw data format parameter to include a file format ID corresponding to a raw data format type supported by the source.

4. The method according to claim 3, wherein the step of modifying the negotiation field by the sink to change an item of transfer control information comprises the step of leaving the raw data format parameter unchanged to indicate that the sink will accept the transfer of raw data in the format corresponding to the file format ID.

5. The method according to claim 3, wherein the step of modifying the negotiation field by the sink to change an item of transfer control information comprises the step of modifying the raw data format parameter to indicate that the sink will not accept the transfer of raw data in the format corresponding to the file format ID.

6. The method according to claim 1, wherein the source supports nonblocking behavior and has been initialized to provide non-blocking behavior.

7. The method according to claim 6, wherein the step of receiving a request at the image data source to push image data to the image data sink is followed by the step of responding to the request by indicating that the source is temporarily unable to read an input stream associated with the image data.

8. A computer-readable medium, having computer-executable instructions for performing a method of transferring image data between an image data source and image data sink, comprising the steps of:

receiving a request at the image data source to push image data to the image data sink;

writing transfer control information to a negotiation field by the image data source, wherein the transfer control information includes transfer control parameters having dimension parameters and transfer control flags having a first flag and a second flag; and further wherein if the first flag is set by the source, the source image data is fully scalable, or if the second flag is set by the source, the source image data is partially scalable;

modifying the negotiation field by the sink to change an item of transfer control information, wherein if the first or second flag is set by the source, the sink modifies the dimension parameters to indicate preferred dimensions of image data;

reading the modified negotiation field by the source; and pushing the image data from the source to the sink in accordance with the transfer control information of the modified negotiation field, wherein the image data is pushed in accordance with the preferred dimensions if the first flag is set by the source, or the image data is pushed in accordance with dimensions from a set of dimensions supported by the source that are closest to the preferred dimensions if the second flag is set by the source.

9. The computer-readable medium of claim 8, wherein the second flag is set by the source, further comprising the step of further modifying the negotiation field by the image data source to change an item of transfer control information prior to the step of pushing the image data from the source to the sink in accordance with the transfer control information of the modified negotiation field.

10. The computer-readable medium of claim 8, wherein the transfer control parameters comprise a raw data format parameter, and wherein the step of writing transfer control information to a negotiation field by the image data source comprises writing the raw data format parameter to include a file format ID corresponding to a raw data format type supported by the source.

11. The computer-readable medium of claim 10, wherein the step of modifying the negotiation field by the sink to change an item of transfer control information comprises the step of leaving the raw data format parameter unchanged to indicate that the sink will accept the transfer of raw data in the format corresponding to the file format ID.

12. The computer-readable medium of claim 10, wherein the step of modifying the negotiation field by the sink to change an item of transfer control information comprises the step of modifying the raw data format parameter to indicate that the sink will not accept the transfer of raw data in the format corresponding to the file format ID.

13. The computer-readable medium of claim 8, wherein the source supports non-blocking behavior and has been initialized to provide non-blocking behavior.

14. The computer-readable medium of claim 13, wherein the step of receiving a request at the image data source to push image data to the image data sink is followed by the step of responding to the request by indicating that the source is temporarily unable to read an input stream associated with the image data.

* * * * *